Oct. 5, 1943.   M. R. WOLFARD   2,330,854
SAW
Filed Aug. 3, 1940   3 Sheets-Sheet 1
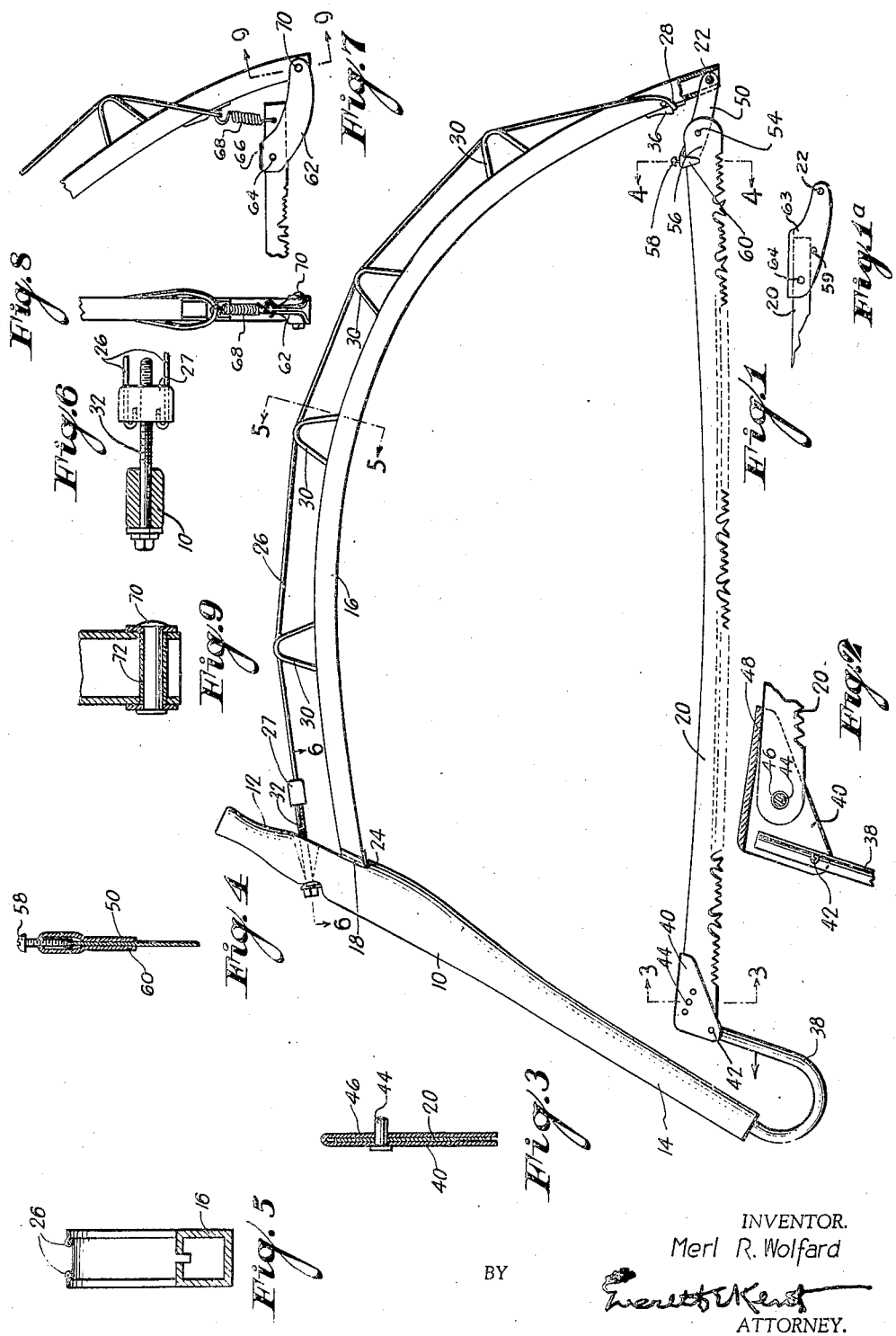
INVENTOR.
Merl R. Wolfard
BY
ATTORNEY.

Oct. 5, 1943.  M. R. WOLFARD  2,330,854
SAW
Filed Aug. 3, 1940  3 Sheets-Sheet 2
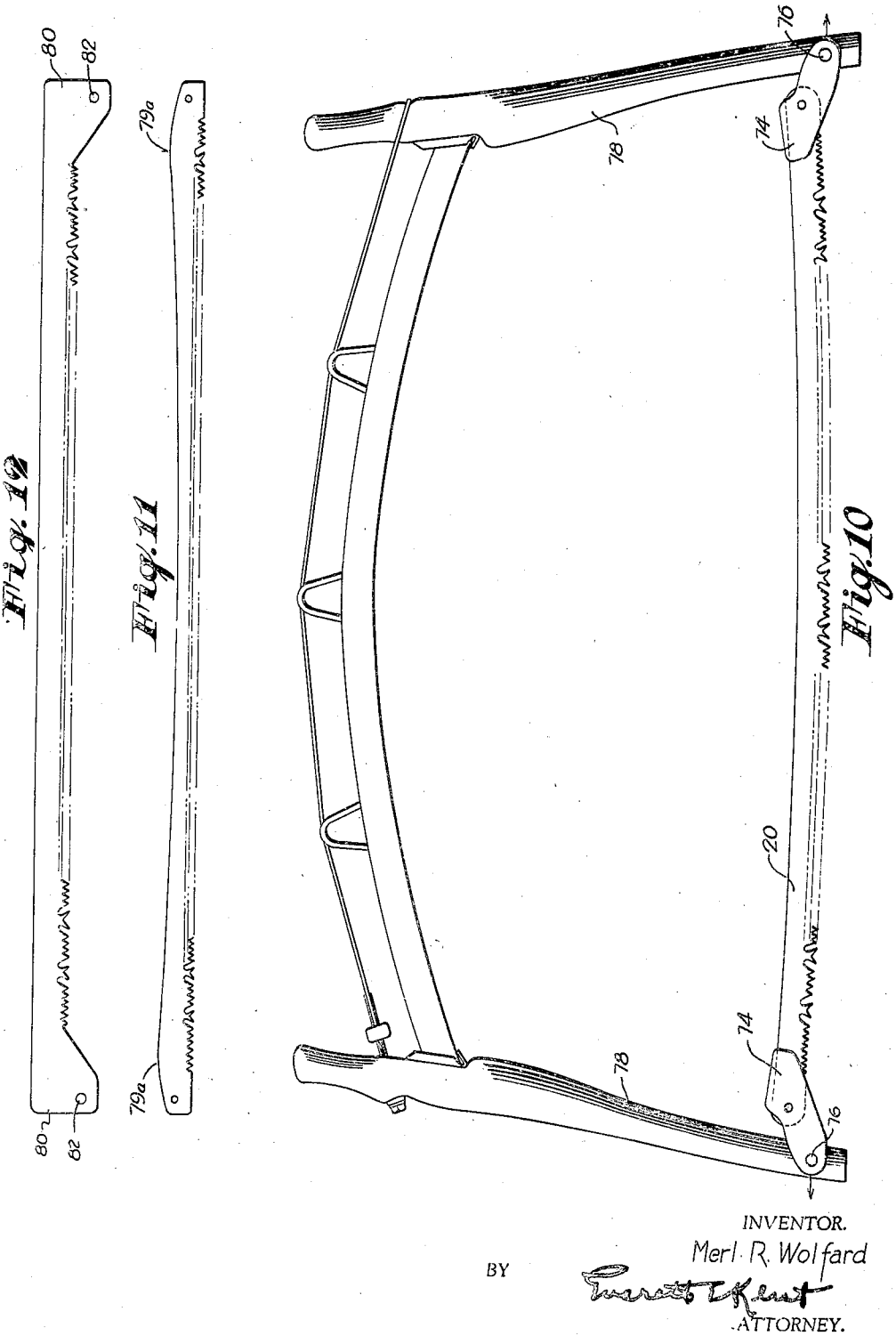
INVENTOR.
Merl R. Wolfard
BY
ATTORNEY.

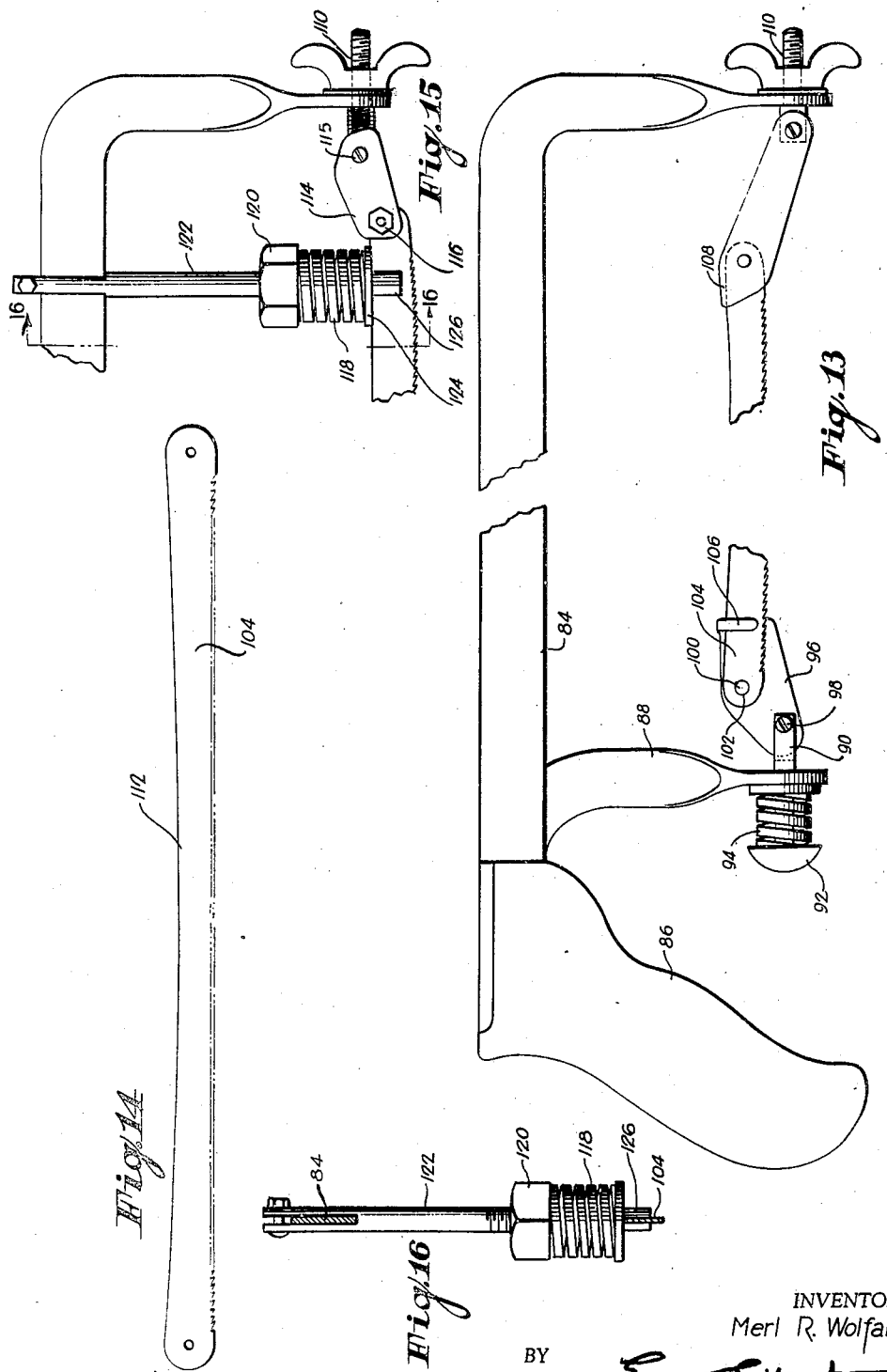

Patented Oct. 5, 1943

2,330,854

UNITED STATES PATENT OFFICE 2,330,854

SAW

Merl R. Wolfard, Cambridge, Mass.

Application August 3, 1940, Serial No. 350,363

8 Claims. (Cl. 145—32)

This invention relates to improvements in saws.

More particularly it relates to saws wherein a blade is held at its ends in a blade-spanning and blade-tensioning frame.

The invention provides improvements in spanning saw frames, and particularly in means for mounting and tensioning the blade in the frame. Also, for relatively narrow saw blades, such as hack saw blades and pulpwood saw blades, improvements are provided in the blade itself, whereby the blade coacts with its mounting and tensioning means in attaining new results and improved effects.

Heretofore it has been customary to mount saw blades in spanning frames so that the frame applies directly a tensioning pull longitudinally through the blade. Users of saws with narrow blades, as hack saws and buck saws, are familiar with certain behaviors and annoying tendencies of the saw, experienced whenever a feeding pressure is applied to the blade. Such a feeding pressure may be only the total weight of the saw, as when cutting dry, soft wood, but usually it includes additional pressure which the operator applies for more rapid cutting, as when using a hack saw, where the weight of the saw alone usually is not nearly sufficient. Also, in sawing hard woods, or any wood which tends to gum or pinch the blade, some additional pressure is desirable.

The said annoying behaviors of the saw are that the blade becomes flabby along its toothed edge, and thereby makes it impossible for the operator to cut both straight and rapidly at the same time. Also, this flabbiness permits the blade to become easily jammed or cramped in the kerf, with the result that the blade is broken. Also, in connection with my discovery of the cause of these evils, and a remedy for them, I have found that the practice heretofore prevalent tends to reduce the effectiveness of the successive tooth attack on the work, thereby reducing the cutting speed of the blade, and also the life of the blade. An underlying fact, in saw construction hitherto prevalent, is that the feeding pressure has a tendency to cause the blade to become concave edgewise at the toothed edge of the blade, during the stroke.

It is a leading feature and result of the present invention that this concavity at the toothed edge of the blade is replaced by an imposed convexity at the toothed edge of the blade. Thereby both the cutting speed and the life of the blade are increased. Also it is possible to cut both straight and rapidly at the same time. And the possibility of the blade becoming jammed or cramped in the kerf is reduced to such a minimum that blades will seldom be broken.

This imposed convexity of the toothed edge of the blade provides a particular kind of yieldable relationship in the approach of the blade to the work, which is wholly new in saw construction, so far as I am aware. In a hand operated saw this imparts a uniformity in feeding pressure, and results in a smoothness through the cutting stroke, which I believe have never been attained before.

The convexity of the toothed edge of the blade is imposed by applying an edgewise bending strain to one or both end portions of the blade. This would tend to make the back edge of the blade slack; and so it becomes a further object of the invention to avoid that. Possible slackness of this sort is reduced and other advantages are attained by making a saw blade whose middle portion, being the principal cutting portion of its length, is narrow; and whose end portions where said bending strains are to be applied are wider. Also, by providing this wideness, it is possible to increase further the imposed convexity of the toothed edge of the blade, above what would be practicable for a blade having ends no wider than the desired width of the middle of the blade.

The straining of the end portions of the blade so as to make the toothed edge convex causes the major degree of tautness through the blade to be positioned at the toothed edge. This is a factor in giving to the operator a control of both the effectiveness and the direction of the cutting while pressing on the work, which he does not have in saws made as hitherto customary.

And whereas a straight tensioned saw of prior art becomes concave with the first transverse pressure applied to it, it is a feature that in a saw embodying the present invention the convexing stress may be such a strong out-bending force as to permit a yielding of the blade, through the entire range of feeding pressure which is suitable for the blade, without the blade becoming concave.

Another object of the invention is to provide means for producing the said convexity, which is by means connecting the ends of the saw blade with the spanning frame. This device permits selective control of the convexity. And it may be arranged to contribute further to this yieldable relationship in the approach of the blade to the work. It is a feature to attain this object by a device which transmits the main tautening tension to the blade.

A lever is provided whose fulcrum is a pin engaged through a hole in the end portion of the blade. Means is provided to impress on the blade, at a leverage distance from the fulcrum, a moment tending to rotate the mid-portion of the blade outward about that fulcrum. Said means may include a spring. However for ordinary work a lever may be used, which may be a bell crank lever, its power arm being connected to be pulled by the tautening tension of the frame on the blade, its work arm having a hook to engage over and press down on the top of the blade, thus tending to bend the mid-portion of the blade edgewise outward.

Another object of the invention is to provide so that some of the imposed convexity will be maintained in the toothed edge of the blade even under abnormally severe operating conditions. This applies especially to saws in which all the cutting is done by a pushing stroke, as in a hack saw; or where a major portion is done by pushing, as many persons do in using a buck saw. This is accomplished by including elastic means, normally in a state of tensile extension, in the connection between the handle end of the frame and the adjacent end portion of the blade. While this may be a spring of any suitable sort, it is a feature, especially useful in relatively large saw frames, that the near end of saw blade and its mounting means may be spaced inward of the span, a little distance from the grip portion of the handle, as by making this a U-spring, whereby the user can grasp the handle, and so can apply the propelling force, in a direct line with the longitudinal extent of the blade.

The spring, of whatever type thus introduced into the line of tension for tautening the blade, has utility also with saw frames of types heretofore customary, in which blades are mounted without the convexing connection.

In saws held in a spanning frame, in which cutting is done with a pushing stroke, the drag of the work tends to bend the leading end of the frame back toward the work and so to shorten the span. The push tends to bend the handle end of the frame closer to the work. In saws not having benefit of the invention this introduces a wave of slackness, permitting lateral bending, into that portion of the blade which is approaching the work, with danger of breaking the saw. But with the spring of the invention introduced into the line of tension, and being normally in a state of elastic extension, this spring will take up such a slack without a wave being formed, thus eliminating this cause of breakage, which is especially frequent in hack saws.

Another object of the invention is to provide a spanning frame which can be made strong and stiff against the tensioning pull necessary for imposing effective convexity at the toothed edge of a long blade, and, further, will be so light as to be practicable for use in a size which is long enough and deep enough to span larger logs than could heretofore be cut with saws of this type.

The description of this, and other features of the invention, will appear hereinafter. Although the invention is illustrated with particular types of saw frames, it should be understood that it is applicable with other types of spanning frames, hand or power driven, and also that changes in the details of the connecting devices between the frame and the ends of the saw blade may be made, all without departing from the scope of the invention.

It is intended that the patent shall cover, by suitable expression in the appended claims, whatever features of patentable novelty exist in the invention disclosed.

In the accompanying drawings:

Figure 1 is a side elevation of a saw embodying features of the invention;

Figure 1ᵃ is a modification of a detail in Figure 1;

Figure 2 is an enlarged elevation, partly in section, of the left hand blade-holding clip of Figure 1;

Figure 3 is an enlarged section on 3—3 of Figure 1;

Figure 4 is an enlarged section on 4—4 of Figure 1;

Figure 5 is an enlarged section on 5—5 of Figure 1;

Figure 6 is a plan, in section on 6—6 of Figure 1;

Figure 7 is an elevation of a fragment of a modified form of blade holder which may be employed in place of the holder at the right hand end of the saw of Figure 1;

Figure 8 is an end elevation of the device of Figure 7, looking from the left in Figure 7;

Figure 9 is an enlarged section on 9—9 of Figure 7;

Figure 10 is a side elevation of a two-man saw, embodying features of the invention;

Figure 11 is a side elevation of the saw blade of Figure 10 when relieved of tension;

Figure 12 is a side elevation of a modified form of blade having structural features for combining with my improved mounting means;

Figure 13 is a side elevation of a hack saw, embodying features of the invention, mid-portions of frame and of blade being broken away for conservation of space;

Figure 14 is a side elevation of the blade of Figure 13 when relieved of tension;

Figure 15 is an elevation of the remote end of a hack saw having a modified form of blade holding and tensioning means; and Figure 16 is an endwise elevation looking from the left in Figure 15.

Referring to the drawings, the saw frame of Figure 1 has a handle 10 which may be of wood, and which may have an upper grip portion 12 and a lower grip portion 14.

Mounted on this handle is a structure which projects from the upper part of the handle outward and downward, in bow form, as a thrust column, to where it holds the remote end of the saw blade. In the style represented in Figure 1 this is based on a plate 18 set on the handle a little below the upper grip 12. The compression member in the spanning structure is a tube 16 preferably of light metal, as aluminum alloy, of rectangular cross-section, which has at its outer end a fastening for holding the remote end of the saw blade 20, the particular style shown being a cross pin 22. A shoulder 24 on the handle cooperates with the metal plate 18 to constitute a step for supporting the inner end of the compression member 16. This member cooperates with a tensile member, which may be composed of one or more elements that extend along the convex side of the curved compression member, and which has its outer end anchored to the outer end of the compression member preferably on the concave side of the latter. In the form illustrated in Figures 1, 7 and 8, the tensile member is a loop of strong wire 26 which extends from a cross bar 27 at the handle end to the remote free end where the loop engages under a lug 36 on the concave side of the curved compression member 16. Struts 30, on the convex side of the compression member keep the course of this wire tie spaced at the said desired distance from the compression member. Its attachment to handle 10 is preferably by an adjustable tensioning means, as by a screw 32 transfixing the cross bar 27. When the tensile member has been made taut by the screw, the compression member is held firmly against the handle, on the plate 18 and against the shoulder 24. Increase of tension in the loop 26 acting against the spacing struts 30 tends to straighten the curved compression member, thus tending to swing its remote end at 28 away from the handle, and also tending to swing the lower part of the handle 14 in the opposite direction. Thus the screw 32 can apply tension lengthwise to the saw blade 20.

On the forward thrust stroke applied by the handle, resisted by drag of the blade in the work, the tensile member 26 tends to prevent the leading end of the compression member at 22 from yielding backward toward the handle.

The composite span structure thus constituted is light, stiff and strong; but any other suitable span structure may be substituted.

The blade, suspended in tension between the ends of whatever spanning frame, is preferably mounted so that the applying of this tension to the blade produces edgewise bending pressure at either or both of its ends, in direction tending to make the toothed edge of the blade be convex. Preferably, also, there is resilient means, normally standing extended in a state of tension, through which the line of tension passes at the handle end of the blade.

In the embodiment of the invention illustrated in Figure 1, the said resiliency is provided by a U-rod 38 of spring metal, relatively stiff, a portion of one limb of which is set securely in the lower end of handle 10. The free limb of the U-spring 38 carries a bell crank lever 40, which may be a sheet metal stamping, suitably bent. The power arm of this lever is pivoted on the end of the U-spring, at 42; and the lever carries a fulcrum pin or lug 44 which engages in the usual hole 46 in the end of the saw blade. The work arm has a cross and return bend, the bend portion 48 of which is pressing against the back edge of the blade at a leverage distance from the fulcrum 44. When the blade is under tension the spring U is spread, its resilience, tending to close the U in the direction of the small arrow, pulls the power arm of lever 40, toward the handle, at a point below the fulcrum pin 44. A tensioning pull on the blade tends to rotate the lever, pressing its arm 48 down on the back edge of the blade, tending to swing the mid-portion of the length of the blade downward about the pin 44. This puts the blade under edgewise strain; and the resulting stress tends to flex the blade edgewise in direction to produce convexity at the toothed edge. This bell crank lever would do this whether the spring 38 is present or absent in the line of tension applied by the saw frame to hold the saw blade taut.

A tightening of the screw clamp 32 will increase the longitudinal tension, and consequently the tendency to convex bending of the blade. To the extent that the spring has been stretched by tension lengthwise of the blade, the spring can withdraw, and so prevent the arising of any slackness which otherwise would develop in the blade during a pushing stroke on the handle.

Preferably the remote end of the blade may be held in a bell crank lever 50, comparable to the lever 40, but whose power arm is pinned directly to the remote end of the frame, as at 22. This lever has a cross-pin or lug 54 for engaging in the usual hole in this end of the blade; and has a work arm 56 for engaging the back edge of the blade. A screw 58 may be provided for adjusting this edge-engagement so as to increase or decrease the tendency of any given tension in the blade to produce edgewise bending.

Figure 1a shows a modification of this leverage by simple reversal. Tension of the frame, pressing a pin or hook 59, in the lever 63, up against the saw blade 20, tends to rotate this end part of the blade about the pin 64, and so to convex the mid-portion.

The return bend 48 of lever 40 preferably will be deep and narrow, as seen in Figure 3, for fitting close to each side of the end portion of blade, in which case there will be flat walls close at each side of the blade, tending to prevent tilting and lateral vibrations of the blade.

To facilitate the act of mounting the blade, the other lever 50 may be of inverted J shape, in cross-section, with a broad flat surface on one side and a relatively short tongue 60 reaching as a hook over the back edge. The adjusting screw 58 may be located at the base of this tongue, as seen in detail in Figure 4.

Figures 7–9 illustrate a modified form of lever, 62, having a bolt or cotter pin 64 engaging as fulcrum in the hole in the saw blade, and with a U-bend 66 for engaging both sides of the blade. A coil spring 68, extending between the frame and a part of the blade which is between the frame and the fulcrum, provides resilient edgewise force tending to produce convexity at the toothed edge, and provides a special kind of softness, or easing away, of the blade at the beginning of a cutting stroke. As seen in detail in Figure 9, the pivot 70 may include a bushing 72 extending across the hollow of the frame, for reducing wear on the thin walls of the compression member.

The saw of Figure 10 is a two-man saw wherein each end of a saw blade 20 is mounted in a lever 74, each being pivoted at 76 on the lower end of its handle 78. The action of each lever is similar to that of the lever 40 of Figure 1, so that any pull applied to the blade, tends to bend the saw in direction to produce convexity at its toothed edge. The saw is represented with its edge convex as when under tension of a pull in either direction, indicated by an arrow.

Figure 11 shows a saw blade 79 which is narrow, in the edgewise direction, throughout its middle portion and is wider near its end portions, whereby its edgewise beam-depth is increased. This permits a greater bending strain to be imposed at its end portions, to convex the blade, without producing flabbiness at the back of the blade in said end portions. Also, the smaller edgewise beam-depth in the middle portion of the blade permits more edgewise bending, and therefore greater convexing of the toothed edge without the back of the blade, in its middle portion, becoming flabby. In the proportions shown the end portions are only approximately twice as wide as the middle portion, behind the gullets, but the stiffness of the end portions is four times that of the middle portion; because, the stiffness of a beam increases with the square of its depth.

If this blade were mounted in a tensioning and convexing lever, such as 74 in Figure 10, the convexing pressure would be applied at the back of the blade at the position of its maximum stiffness, as at 79a. From this point 79a the back of the blade 79 is tapered rapidly toward its ends, in order that it may be used interchangeably with narrower blades in mountings, such as 74. The uncut depth, at the middle portion of a demonstrating blade 79, was only slightly greater than the height of the raker teeth, measured from the bottom of the deepest gullet. The utilitarian range in proportions, for a blade of this type, is expressed by stating that the uncut width of the middle portion of the blade is less than twice the depth of the deepest gullet, and the end portions may be wider in that proportion which will provide an increase in stiffness suitable to convex the blade, for the purpose in hand, when edgewise bending is applied to its end portions.

Figure 12 shows a blade having outstanding end portions 80, extending below and beyond the toothed edge of the blade. The mounting holes 82 are located in these outstanding portions, below the line of the toothed edge, so that tensioning of the blade in the span of a saw frame will produce convexity of the tooth edge, because each said outstanding end portion of the blade containing a hole 82 at which the tensioning pull of the frame is applied acts as a lever, irrespective of its being integral with the blade, in a manner similar to the action of levers 40 and 50 shown in Figure 1. The blade in Figure 12 is illustrated as being uniform in width between the outstanding end portions; but the parts of its end portions which are contiguous to said outstanding portions may be increased in width to provide additional stiffness, as set forth above in the description of Figure 11.

Figures 13–16 illustrate features of the invention applied in hack saws. Figure 13 shows an ordinary hack saw frame 84 with handle 86. To embody the invention, the blade supporting arm 88 carries a square bolt 90 whose axis is parallel to the general direction of extent of the blade in the frame. The bolt has a head 92 at its end which is outward at the handle end; and a stiff coiled spring 94 intervenes between this head and the arm 88 of the frame. A lever 96 which may be a stamping of sheet metal is engaged on both sides by and is pivoted through the end of the bolt at 98. The lever has a crosspin or lug 100 for engaging in the hole 102 in the end portion of blade 104; and has a tongue 106 reaching over the back edge of the blade and extending downward on the near side of the blade, to prevent tipping, and for steadying it against lateral vibration. The pin 100 and the tongue 106 are in a bell crank relation to pivot 98 such that tensioning of the blade by pull on 98 places the blade under edgewise stress tending to produce convexity at the toothed edge.

At the other end, a lever 108 acts similarly, being pulled by an ordinary tensioning screw 110 on which the lever 108 is pivoted.

The blade 104 may have a shape such that when relieved of tension its back edge is concave as indicated at 112 in Figure 14. Thus the middle portion of the blade, throughout the greater part of its region which slides through the work, can be made narrow, to reduce friction on the side of the blade and also permit a high degree of edgewise bending without the back edge becoming flabby; and the portions near its ends, where the bending stress is applied, may be made wider to resist greater pressure without becoming flabby.

There is improvement in efficiency of cutting and in the smoothness of operation resulting from the yieldable approach of the blade to the work, as emphasized hereinbefore; but, in Figure 13 a special feature is introduced, in that, between pivots, the lever 108 is about twice as long as the lever 96. This has special merit in a hack saw adapted to cut metals, wherein there is a tendency to "bite" at the beginning of a cutting stroke. This tendency to bite is particularly noticeable when cutting soft metal, such as brass or aluminum, or even cutting edgewise into a thin piece of steel, with a sharp toothed blade. The longer lever 108 permits that end of the blade which first attacks the work to "ease away" from the work, and, as the other end of the blade approaches the work, the resistance against easing away is increased, to an extent which an experienced hack saw user readily perceives.

Figure 15 illustrates a modified form of blade mounting for producing an easing away effect comparable to that attained by the lever 108 in Figure 13. Here, the connection of the blade endwise to the tensioning screw 110 of the frame is merely a link 114 and suitable cross pins 115 and 116.

Resilient edgewise pressure is incident at the back edge of the blade, inward from the link 114, at a point toward the mid-length portion of the blade, which tends to flex the blade edgewise in direction to cause its toothed edge to be convex. The particular resilient means illustrated is a coil spring 118, strung on a rod 122 depending from the frame, whose lower end is slotted with prongs 126 astride the blade to prevent sidewise tilting of the blade. The spring is between an adjusting nut 120 on the rod and a disk 124 resting on the back edge of the blade.

If the cross pin 115 is made coincident with 116, then convexing of the blade may still be produced by the spring 118; but the easing away of the approach of the blade to the work at the beginning of the cutting stroke will not be present.

I claim as my invention:

1. In the combination of a saw blade of resilient material, a spanning blade tensioning frame, and connecting means by which the frame holds the blade and tensions the blade lengthwise, that improvement in said connecting means which comprises a leverage means therein, acting in the plane of the blade, to whose power arm the tensioning pull of the frame is applied to bend the blade edgewise in that direction which will convex the toothed edge of the blade; thereby maintaining convexity in that portion of the toothed edge of the blade which is approaching the work during a cutting stroke, notwithstanding resilient yielding of that part of the blade which is being pressed against the work.

2. In the combination of a saw blade of resilient material and a spanning, blade-tensioning frame; connecting means between said frame and blade comprising leverage means acting in the plane of the blade, whose power arm is hitched to the frame at a location which is on the toothed edge side of the projected line of the base of the teeth of the blade, which said hitch is the means for transmitting the blade tensioning pull of the frame to the blade.

3. In the combination of a saw blade of resilient material and a spanning, blade-tensioning frame; connecting means between the frame and the blade, comprising a bell crank lever fulcrumed intermediate its ends to an end portion of the blade, the work arm of said lever engaging the back edge of the blade and pressing it toward the toothed edge at a place on that side of the fulcrum which is toward the mid-portion of the blade, and the power arm of said lever being connected at its outer end to the blade-tensioning frame.

4. In the combination of a saw blade of resilient material and a spanning, blade-tensioning frame; connecting means between the frame and the blade, in which the connecting means comprises, in combination, a transverse pivotal bearing near the end of the blade; and means pressing edgewise against the blade, near said bearing but at a leverage distance from said bearing, in that direction in which tensioning pull will convex the toothed edge of the blade.

5. A combination as in claim 1 in which the width of the blade throughout its mid-portion is relatively narrow, and the width of the blade toward its end portions progressively increases relatively to the width of the mid-portion, thereby providing lateral stiffening in the end portions of the blade under the said edgewise bending stress.

6. A combination of saw blade, spanning frame and connecting means, each as in claim 1, in which the saw blade has teeth which are by length and size adapted to the cross cutting of logs; said blade having an uncut width throughout its mid-portions of less than twice the depth of the deepest gullet in said mid-portions; the uncut width of said blade increasing progressively toward the ends of the blade to a width which exceeds double that of said deepest gullet, thereby providing lateral stiffening in the end portions of the blade under the said edgewise bending stress.

7. A combination of saw blade, spanning frame and connecting means, each as in claim 1, in which the saw is adapted to be pushed toward the work during its cutting stroke; which said connecting means includes elastic means through which the said tensioning pull is transmitted to the blade from that end of the frame to which pushing power is applied, said elastic means having amplitude of yieldability sufficient to apply tension to the blade throughout an extent greater than the range of yieldability of the remaining portion of the total spanning frame during a cutting stroke, thereby to maintain by elastic tension convexity within that portion of the saw blade which is approaching the work during a cutting stroke.

8. A combination of saw blade, spanning frame and connecting means, each as in claim 2, in which the saw is adapted to cut when pushed toward the work, in which the said connecting means includes a U-shaped spring interposed between that end of the frame to which pushing power is applied and the blade; the said hitching of the power arm being at that arm end of said U-spring which is nearer the blade; said U-spring elastically applying tension to the blade and having amplitude of yieldability sufficient to apply tension to the blade throughout an extent greater than the range of yieldability of the remaining portion of the total spanning frame during the cutting stroke, thereby to maintain by elastic tension convexity within that portion of the saw blade which is approaching the work during a cutting stroke.

MERL R. WOLFARD.